United States Patent
Banerjee et al.

(10) Patent No.: US 6,292,181 B1
(45) Date of Patent: Sep. 18, 2001

(54) STRUCTURE AND METHOD FOR CONTROLLING A HOST COMPUTER USING A REMOTE HAND-HELD INTERFACE DEVICE

(75) Inventors: Biswa R. Banerjee, San Jose, CA (US); S. Christopher Gladwin, Buffalo Grove, IL (US); Arif Maskatia, Milpitas, CA (US); Alan Soucy, Long Grove, IL (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/300,500

(22) Filed: Sep. 2, 1994

(51) Int. Cl.$^7$ ................................................ G09G 5/00
(52) U.S. Cl. ........................................................ 345/179
(58) Field of Search ........................... 345/169, 173–179, 345/182, 183, 2; 455/66; 364/132, 138, 188, 709.11, 709.13; 340/825.06, 825.72

(56) References Cited

U.S. PATENT DOCUMENTS

| | | | |
|---|---|---|---|
| 4,916,441 | * 4/1990 | Gombrich | 345/169 |
| 5,194,852 | * 3/1993 | More et al. | 345/182 |
| 5,307,297 | * 4/1994 | Iguchi et al. | 345/169 |
| 5,309,351 | * 5/1994 | McCain et al. | 395/132 |
| 5,423,045 | * 6/1995 | Kannan et al. | 395/750 |

OTHER PUBLICATIONS

"The Computer for the 21st Century" by Mark Weiser, Scientific American, Sep. 1991 pp. 94–104.*

* cited by examiner

Primary Examiner—Jeffery Brier
(74) Attorney, Agent, or Firm—Katten Muchin Zavis

(57) ABSTRACT

A mobile interface device receiving input from a stylus is provided to remotely control application programs running on a host computer. Such an interface device provides convenient access to any resource of the host computer, including, for example, a sharable database. An embodiment of such an interface device includes a pen-based graphical interface which communicates with an operating system on the host computer. In that embodiment, the operating system on the host computer has handwriting recognition capability.

9 Claims, 10 Drawing Sheets

FIG. 1d-1

| Device | State | Clocks Disabled | Comments | Wakeup Source |
|---|---|---|---|---|
| Microprocessor | Static Suspend | Clock Stop Control by 368 | Static Mode entered when clock stopped | Clock Restarted and controlled by 368 |
| PICO 368 | Static Suspend | Clock Stopped/ 32Khz Left on | | Activity on EXACT, SWITCH, or RING pins |
| 82C206 | Static | 32 Khz Source | | Any Interrupts |
| Main Memory | Slow Refresh | Pico368 38Khz | Memory Refreshed at 128mS | |
| Video | Static | 14 Mhz disconnected | Controlled through use of Evergreen 368 power management pins. | When system is resumed |
| Video Memory | Slow Refresh | 32 Khz | Memory Refreshed at 128mS | Video Controller automatically adjusts refresh rate depending on mode |
| LCD Module | OFF | NA | Power to Module will never be applied in Sleep | Controlled by Video controller power up sequencing |
| LCD Backlight | OFF | NA | Backlight will never be on in sleep | Controlled by Video controller power up sequencing |
| UART | Static | 1.84 Mhz | Part has no direct power management. | |
| UART Trans. | OFF | NA | Part turned off, until access to UART. Inactivity timer will start, and look for a time-out of two minutes before turning off transceiver. | Access to serial port |

| | | | |
|---|---|---|---|
| ROM | Static | NA | After ROM is shadowed, the CS and OE line will be driven high to keep these parts in a static mode. |
| NVRAM | Static | NA | After NVRAM is read, the CS line will be high which forces part into a static mode. |
| Pen Controller | Sleep | Own 4.0 mhz | Sleeps after each point is processed as long as the pen is not pressed to the screen. | Pen Down wakes up Pen controller. Pen controller asserts the PEN_ACTIVITY signal, which will wake up the entire system. |
| Hook | Active | Own 32 khz | Keeps the last display as told by the keyboard controller | NA |
| Clock Generator | Active | All Clocks Running | Clocks needed in order to wake system back up. | |
| Radio | Sleep | Internal | Radio Handles its own power management | Wakes up on periodic basis in order to keep SYNC. When a packet is ready, the Radio will assert the activity pin to the RING input of the 368 which will wake up the system |

FIG. 1d-2

Key to FIG. 1d  | FIG. 1d-1 |
                | FIG. 1d-2 |

STRUCTURE AND METHOD FOR CONTROLLING A HOST COMPUTER USING A REMOTE HAND-HELD INTERFACE DEVICE

BACKGROUND OF THE INVENTION

1. Field of the Invention

This invention relates to the design of a mobile interface device, and in particular, relates to the design of mobile interface device having a pen-based user interface.

2. Discussion of the Related Art

Mobile data processing devices (MDPD), including such mobile computers popularly known as personal digital assistants (PDAs), are beginning to proliferate. Because portability is an important consideration in an MDPD and because, in many applications, data entry can be performed without a full keyboard, a "pen" or stylus can be used as an input device for these applications of the MDPD. Portability of an MDPD is desirable because it provides the possibility that the user can accomplish in a mobile fashion tasks which would otherwise have to be accomplished at a desktop computer, or a well-equipped portable computer. However, because of the same portability requirement, MDPDs cannot have the same memory and mass storage resources available locally to accomplish many of these tasks.

Because computer tools can be advantageously used in almost all aspects of business, the business environment (e.g. offices) has been changing rapidly. Computer networks and electronic data communication, e.g. electronic mail and sharable databases, have led to more cooperative efforts among workers. In this regard, especially among the "professional" ranks, workers are becoming more "mobile". In fact, for a significant percentage of all office workers, it is believed that a greater portion of the work day is spent not in one's own office but at conferences or at offices of others. At the same time, because the computer has become an essential tool in the office, the need for immediate data access by these workers wherever they are is even greater.

Another trend resulting from the pervasive use of computers in the work place is the need to place in the hands of "fleet" workers direct access to data. Such fleet workers include workers at hospitals, retail stores, and warehouses etc. Such a worker does not usually perform his or her assigned tasks most efficiently behind a computer terminal. However, substantial productivity benefit can be achieved when such a worker is provided access to data. In some instances, e.g. a nurse at an emergency room, useful data can be collecting by the worker at where he or she is located, using an MDPD. In other instances, e.g. a retail clerk requiring access to inventory, data necessary to carry out the worker's job function can be provided to the worker using an MDPD. In the prior art, special-purpose portable independent devices are designed for use in a specific application. Such special purpose devices are not provided general purpose capability. Such devices cannot be adapted for use in dissimilar applications, and are generally limited to use in well-defined repetitive tasks.

For the mobile professional and for the fleet worker, there is an increasing need for a more flexible and sophisticated machine for data access. For these workers, a portable computer, such as a notebook computer, is not a satisfactory solution. In many applications, because of the collaborative nature of work, data are often required to be readily accessible over a computer network. At the same time, data on portable computers are seldom accessible from a computer network and, very frequently, such data are modified copies of some data already existing elsewhere on a computer network, a desktop computer or a workstation. Consequently, the data stored on a portable computer are often inconsistent with the modified copies of the same data on a desktop computer.

Thus, it is desirable to have an MDPD which can be used as a mobile interface to a desktop computer or a computer network, to take advantage of the resources on the desktop computer or computer network, to provide direct access to a database and to eliminate data inconsistency due to multiple copies of data. Further, such a mobile interface should provide a level of performance sufficient to make using such a device indistinguishable from using a terminal connected to the desktop computer using a conventional wired medium.

Clearly, to provide true mobility to such a device, a wireless link to the desktop computer is essential. To date, a number of manufacturers provide remote control software and hardware that allow packetized data to be sent between a host computer and a handheld digitized tablet over a serial link provided either by a modem or an infra-red (IR) wireless circuit. One such software handles the underlying technology-dependent physical communication protocols, but provides a transport level interface which simulates traditional local area network (LAN) or serial data streams. The wireless link is therefore transparent to an application program interfaced to the software.

SUMMARY OF THE INVENTION

In accordance with the present invention, a mobile user interface device and a method are provided for controlling a program running on a host computer. The mobile user interface device includes: (a) a graphical display subsystem, including a graphical display, for displaying an image; (b) an input subsystem, including a stylus, for providing positional data representing spatial positions of the stylus; (c) a wireless communication subsystem for sending data to and receiving data from the host computer over a wireless communication link; and (d) means for controlling operations of the graphical display subsystem, the input subsystem and the wireless communication subsystem.

To control the execution of a program on a host computer, the means for controlling in the mobile user interface device (i) causes the wireless communication link to be created; (ii) runs the program on the host computer; (iii) receives from the input subsystem the positional data and transmits over the wireless communication link the positional data to the program running on the host computer; and (iv) receives over the wireless communication link from the program running on the host computer data representing the image displayed, or to be displayed, and causes the graphical display subsystem to display the image on the graphical display.

In accordance with another aspect of the present invention, a computer system is provided including a host computer and a hand held interface device. In one embodiment, the hand held interface device includes (i) a display device; (ii) a position input device; (iii) a wireless receiver and transmitter circuit; and (iv) a control mechanism for providing an image on the display device in accordance with input data received through the position input device.

The present invention allows a user control and use of the resources of a larger desktop computer while enjoying the mobility of a hand held computer.

The present invention is better understood upon consideration of the detailed description below and the accompanying drawings.

BRIEF DESCRIPTION OF THE DRAWINGS

FIG. 1b is a block diagram showing one implementation of pen-based device 100 of FIG. 1a.

FIG. 1d summarizes the device activities in viewer 100 under "sleep" mode.

DETAILED DESCRIPTION OF THE PREFERRED EMBODIMENT

The present invention is implemented in an MDPD or a pen-based peripheral device adapted to provide wireless remote access of to an application program. An example of such an application program is one that run under the Pen Windows system, which is a product of Microsoft Corporation, Redmond, Wash. Such a pen-based device can also be integrated into a local area network.

The MDPD of the present invention need not be itself a general purpose computer, such as a PDA. In fact, in the embodiment described below, the MDPD of the present invention is not used as a general purpose computer. In some applications, the MDPD acts as an intelligent interface device to a desktop computer to allow the user of the MDPD to access the data bases or files of the desktop computer. In these applications, because only a single copy of each data base or file is kept, the problem of data concurrency does not arise. When operating as such an interface device, the MDPD communicates with a host computer over a wireless link, and controls the operation of the remote host computer.

The MDPD of the present invention provides a full graphical user interface (GUI) when running an application on the remote computer. In the embodiment described below, text input to the MDPD of the present invention can be provided by (i) an optional handwriting recognition software, which recognizes handwritings entered using a pen device, (ii) a "virtual" keyboard, which is provided by software in the GUI, and (iii) an optional keyboard, which can be physically attached to the MDPD device. Of course, the use of the optional keyboard decreases the mobility of the MDPD device. The virtual keyboard is provided graphically on the MDPD's display by an application program running on the MDPD. In the virtual keyboard, the pen device is used to activate the keys displayed in the GUI.

In the present embodiment, hand-writing is recognized from the successive stylus positions impressed on the MDPD's pen digitizer (i.e. "pen mode"). A desired goal ("pen paradigm") of an MDPD is that the user can treat the MPDP as a note pad and performs his or her tasks as if the familiar tools of pencil and paper are used. In some applications, however, the stylus is used as a conventional position indicating or selection device (i.e. "mouse mode"). The pen and mouse modes are described in further detail below.

Figure 1A:
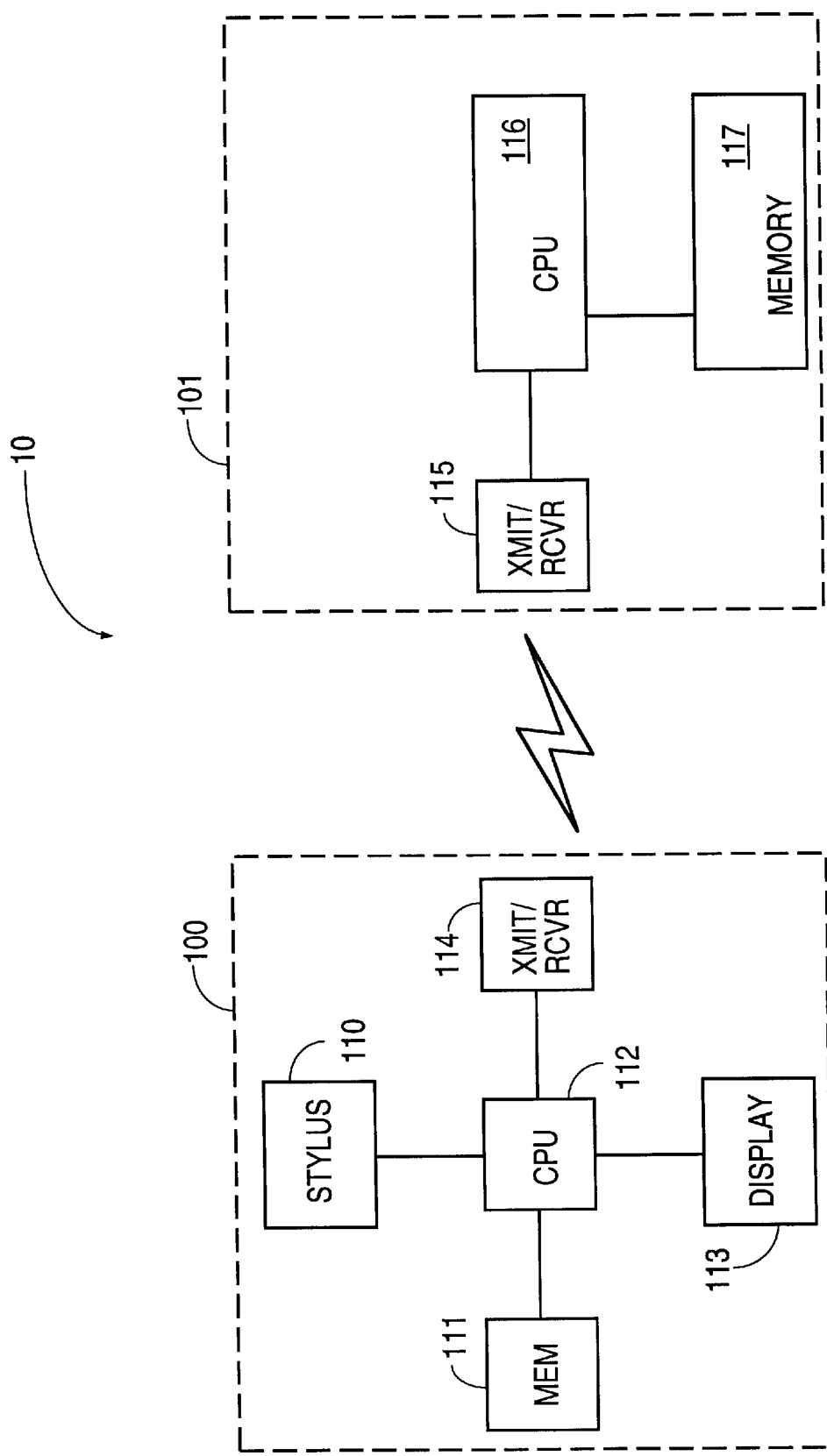
FIG. 1a is a block diagram of the hardware configuration 10 including a pen-based peripheral device 100 and a host computer 101, in accordance with the present invention.
Figure 1B:
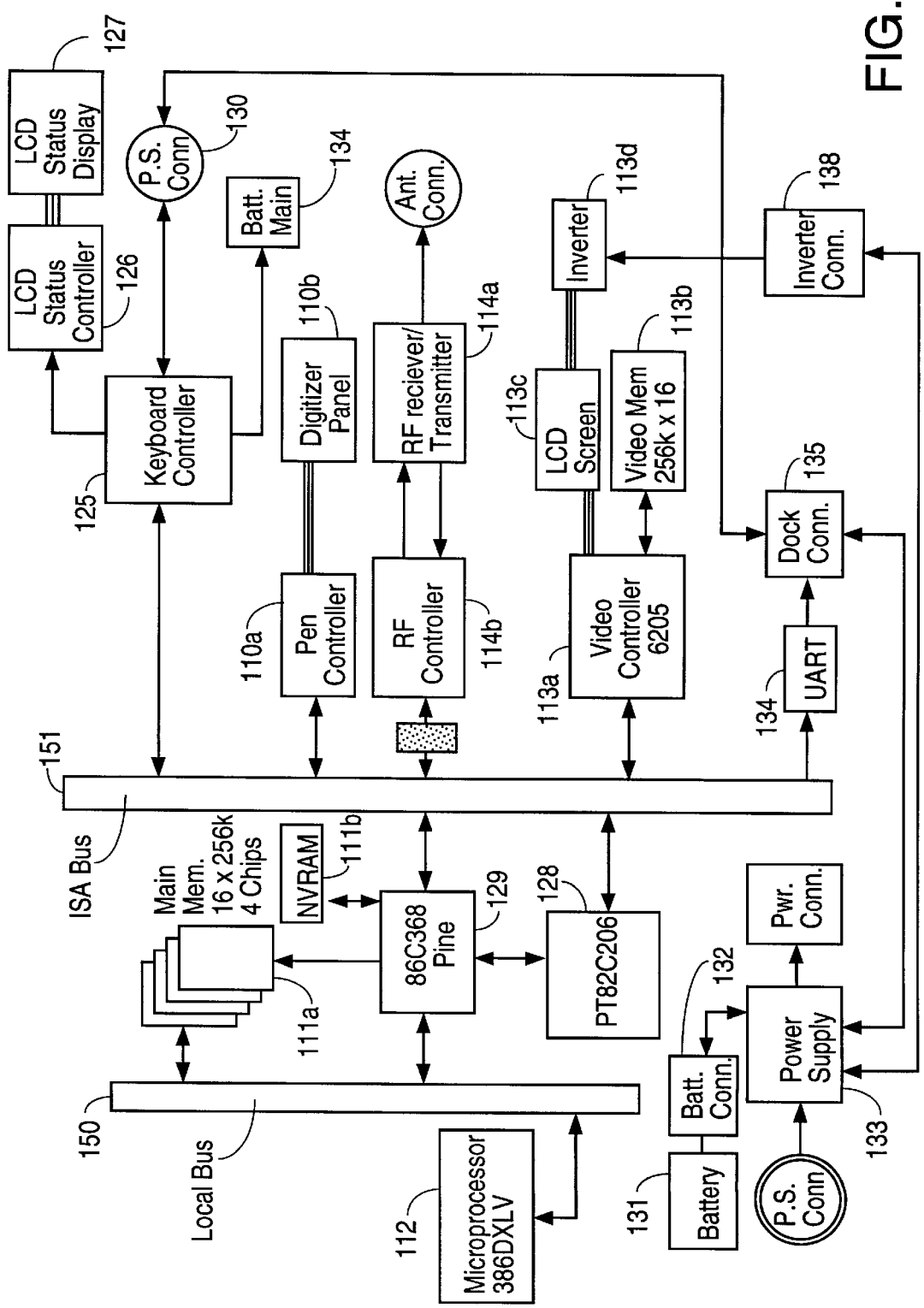

FIG. 1a is a block diagram showing an embodiment of the present invention in a hardware configuration 10, which includes such a peripheral or MDPD 100 (hereinafter "viewer" 100), and a host computer 101. In one embodiment, which is shown in FIG. 1b, viewer 100 is a dedicated peripheral device running a viewer software, which will be described in further detail below. The viewer software connects host computer 101 to viewer 100, which allows the user to control the execution on host computer 101 of any program, such as Windows and Windows applications.

As shown in FIG. 1a, viewer 100 includes a central processing unit (CPU) 112, a local memory subsystem 111, a stylus or pen based input subsystem 110, an LCD subsystem 113, and a communication subsystem 114. FIG. 1a provides only an overview of several functional units of viewer 100. Viewer 100 is provided in further detail in FIG. 1b. CPU 112 is the controller of viewer 100. Of course, the controller of viewer 100 need not be a general purpose microprocessor, or even a microprocessor. Such a controller can be a logic circuit implemented, for example, by an application-specific integrated circuit. Using a general purpose microprocessor as a controller for viewer 100, however, would simplify design.

In this embodiment, as explained in further detail below, local memory subsystem 111 includes one megabyte of dynamic random access memory (DRAM), and one megabyte of non-volatile memory for program storage. Stylus input subsystem 110 may be implemented by a conventional pen digitizer, which is available from a number of manufacturers. Communication subsystem 114 includes a transmitter and a receiver in wireless communication with host computer 101. In this configuration, LCD subsystem 113 displays on an LCD graphics drawn by a program on host computer 101, and stylus input subsystem 110 is the primary input mechanism to control the Windows program on host computer 101 over the wireless link provided by communication subsystem 114. Viewer 100 is preferably built from a lightweight and rugged material, and should be designed for running on battery power over extended periods.

The operation of a stylus in stylus input subsystem 110 is next described. When used in the pen mode, a trail of ink tracking the path of the stylus is desired to maintain the pen paradigm and to provide on the pen digitizer visual feedback to the user. Under the mouse mode, however, a cursor may be generated to follow the "tip" of the pen, but the path of cursor motion is not to be inked. In one proposed industry standard for a stylus or pen-based system, namely the Microsoft Windows for Pen Computing system ("Pen Windows"), the pen mode requires (i) a pen driver that can deliver stylus tip locations every five to ten milliseconds (100 to 200 times per second), so as to achieve a resolution of two hundred dots per inch (200 dpi), and (ii) a display driver that can connect these dots in a timely manner. By these requirements, Pen Windows attempts to provide real time response to maintain the pen paradigm. The Windows for Pen Computing system is promoted by Microsoft Corporation, Redmond, Wash. Details of the Pen Windows system are also provided in Windows version 3.1 Software Developer Kit obtainable from Microsoft Corporation. Under one implementation of the Pen Windows, a maximum of four stylus locations can be stored in a buffer of a module called "PENWIN.DLL" (for "Pen Window Dynamically Linked Library"). Consequently, in that implementation, the maximum latency allowed is twenty to forty milliseconds before any queue tip location is written. Each time the system fails to process a pen event within twenty to forty milliseconds of queuing, a stylus tip location is lost and there is a corresponding impact on the accuracy of the line being traced.

As explained below, a dedicated software ("Viewer Manager 200) is provided in viewer 100 to perform three primary functions: (i) collecting and transmitting to host computer 101 input positional information from a stylus in stylus input subsystem 110, (ii) receiving from host computer 101 a video image to be displayed on an LCD of LCD subsystem 113, and (iii) managing the communications link between viewer 100 and host computer 101 to effectuate the above functions (i) and (ii).

Host computer 101 communicates with viewer 100 over the wireless communication link through communication subsystem 115. Host computer 101 includes a CPU 116 and memory subsystem 117. Other peripherals of host computer 101 may include a mass storage system, such a hard disk, or any mass storage device normally associated with a desk-top computer. Communication subsystem 115 need not be identical to communication subsystem 114. In fact, communication subsystem 115 can be provided either as a device installed in host computer 101, or a shared resource on a local area network (LAN) accessed by host computer 101 over the LAN. On the other hand, the size, weight, and power requirements of viewer 100 constrain communications subsystem 114 to be both portable and low-power.

FIG. 1b shows one implementation of viewer 100.

As shown in FIG. 1b, viewer 100 has both a processor or "local bus" 150 and an industry standard architecture (ISA) bus 151. Local bus 150 operates at the clock rate of CPU 112, while ISA bus operates at the industry standard 8 MHz clock rate. In this implementation, because viewer 100 is expected to operate from battery power, CPU 112 is implemented by a static microprocessor, which allows suspension and resumption of operation by halting and restarting the system clock. Because power management in a portable device is important, CPU 112 should preferably support power management functions, such as System Management Mode (SMM) and System Management Interrupt (SMI) techniques known in the industry. One example of a suitable microprocessor is the AMD386 DXL available from Advanced Micro Devices, Inc., Sunnyvale, Calif., which operates up to 25 MHZ at a 3.0 V supply voltage.

CPU 112 interfaces over local bus 150 with a "system controller" or "core logic" integrated circuit 129. Core logic 129 manages (i) system operation, including local and ISA busses 150 and 151, (ii) memory, and (iii) power and battery power. Core logic 129 can be implemented by, for example, the 86C368 integrated circuit ("pine") available from Pico-Power Technology, Inc., San Jose, Calif. The present implementation takes advantage of the several levels of power management supported by the pine. Power management in the present implementation is described in further detail below. For memory management, the pine provides a dynamic random access memory (DRAM) controller and a non-volatile random access memory (NVRAM) controller. The memory subsystem 111 in viewer 100 is provided by DRAM 111a and NVRAM 111b. As shown in FIG. 1b, DRAM 111a in viewer 100 is provided by four 16 bits by 256 K DRAM integrated circuits, to provide a total of 2 megabytes of memory. NVRAM 111b, which can be implemented using $E^2$PROM technology, provides permanent program storage.

Devices on ISA bus 151 is managed by an integrated peripheral controller (IPC) integrated circuit 128. IPC 128 provides DMA controllers, interrupt controllers, a timer, a real time clock (RTC) controller, and a memory mapper for mapping peripheral devices to the MPDP's memory space. IPC 128 can be implemented by, for example, the PT82C206F integrated circuit, which is also available from the aforementioned PicoPower Technology, Inc.

Stylus input subsystem 110 is implemented by a stylus, a stylus or pen controller 110a and a digitizer panel 110b. Pen controller 110a controls digitizer panel 110b and provides positional information of pen contact. Pen controller 110a can be implemented, for example, by the MC68HC705J2 integrated circuit, available from Motorola, Inc. In this implementation, digitizer panel 110b can be provided by an analog resistive touch screen, so that the stylus is sensed by mechanical pressure. Using a digitizer panel which senses mechanical pressure allows a "dumb" stylus, or even the human finger, to be used as an input device. When using a dumb stylus, switching between mouse and pen modes is accomplished by selecting an icon provided by the MPDP operational software. A 4096×4096 space is covered by digitizer panel 110b. Alternatively, other styli, such as a "light pen" or an electronic stylus with various operating modes, can also be used. In some electronic stylus, switching between pen and mouse modes can be achieved by pushing a "barrel button" (i.e. a switch located on the barrel of the stylus).

Viewer 100 provides in LCD subsystem 113 a LCD 113c, which is controlled by a video controller integrated circuit 113a, and supported by video memory 113b. In this implementation, video controller 113a can be implemented by CL-GD6205 video controller integrated circuit available from Cirrus Logic Corporation, Milpitas, Calif. Video memory 113b is provided by DRAMs organized as 256 K by 16 bits. Video controller 113a communicates with video memory 113b over a separate 16-bit video bus 113d. LCD 113c can be provided as a monochrome display, such as the Sharp LM64P74 (from Sharp Corporation, Tokyo, Japan), or an active matrix color display. In this implementation, video controller 113a provides "backlighting" support through a pin BACKLITEON, which is deasserted to conserve power under certain power management conditions (see discussion below).

Communication between viewer 100 and host computer 101 can be provided either over a direct wireless line or an indirect wireless link. In a direct wireless link, data is transmitted between transmitter/receiver subsystem 114 in viewer 100 and transmitter/receiver subsystem 115 in host computer 101. In an indirect wireless link, data is transmitted between transmitter/receiver 114 and an "access point" device. The access point device is interfaced to a LAN to which host computer 101 is connected. Communication between the access point device and host computer 101 is packetized and is routed using conventional peer-to-peer networking techniques.

In the present implementation, transmitter/receiver subsystem 115 in host computer 101 and transmitter/receiver subsystem 114 in viewer 100 can each be implemented by a 2.4 GHz RF transceiver module with Wireless Media Access Control function, available from Proxim, Inc., Mountain view, Calif. Such a transceiver module is configured either with an ISA interface, or with a PCMCIA interface, known in the art. As shown in FIG. 1b, transceiver/receiver subsystem 114 includes a RF controller 114a and a RF receiver/transmitter 114b.

Viewer 100 is also provided a keyboard controller 125 which performs, in addition to controlling an optional keyboard, battery monitoring and LCD status control. In this implementation, keyboard controller 125 can be implemented by a M38802M2 integrated circuit from Mitsubishi Corporation, Tokyo, Japan to support a PS/2 industry standard keyboard connected through connector 130. Viewer 100 is provided by an "intelligent battery pack" (IBP) 130 connected to system power supply module 133 through battery connector 132. IBP 130 maintains and provides information about the remaining useful battery life of IBP 130, which is monitored by keyboard controller 125. Upon a significant event in IBP 130, e.g. battery remaining life falling below a preset value, keyboard controller 125 generates an interrupt signal in accordance with the SMI power management scheme implemented in battery maintenance circuit 134. In the present implementation, keyboard controller 125 provides to the user visual feedback indicators through six LCD status display "icons", which are driven by LCD status controller 126. The six visual display indicators are:

(a) "waiting", which indicates that viewer 100 is waiting for data from host computer 101, (b) "sleep", indicating that viewer 100 is in either (i) sleep mode (status is "on") or (ii) suspend mode (status is "blinking");

(c) "speaker on", indicating that the built-in speaker of viewer 100 is active;

(d) "in range", indicating one of three states of strength in the radio signal received: (i) strong (status is "on"); (ii) weakening (status is "blinking"); and (iii) connection lost;

(e) "right mouse active", indicating in mouse mode whether the current stylus is operating as the right mouse button; and (f) "Gas Gauge"), indicating the remaining life of IBP 130.

A serial port is provided by a universal asynchronous receiver transmitter (UART) 134, which can be accessed from the outside via serial port connector 135.

Figure 1C:
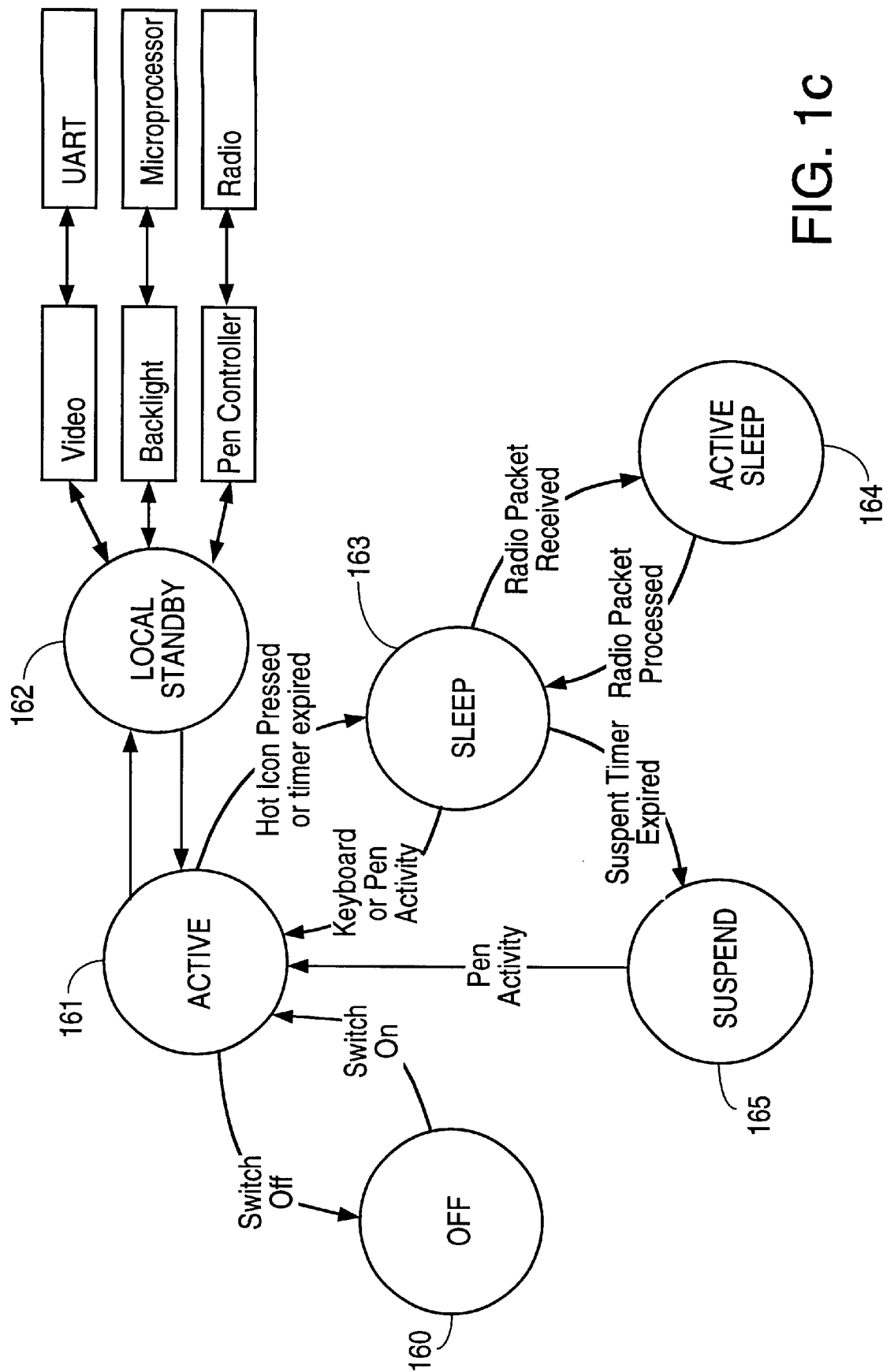
FIG. 1c shows the six internal power management states of viewer 100.

While the user of viewer 100 would only be aware of four power management states: "off", "active", "suspend", and "sleep" modes, internally six power management states are implemented. FIG. 1c shows the six internal power management states of viewer 100.

As shown in FIG. 1c, before viewer 100 is powered, viewer 100 is in the "off"state, which is indicated in FIG. 1c generally by reference numeral 160. In "off" state 160, no LCD status icons would be displayed and no power is supplied to the system. State 161 (the "active"state) is entered when the power switch to viewer 100 is turned to the "on"position. In active state 161, all components of viewer 100 are active.

From active state 161, viewer 100 enters a "local standby"state 162. Local standby state 162 is transparent to the user of viewer 100. From the user's point of view, in local standby state 162, viewer 100 is in "active" mode. In local standby state 162, specific inactive devices are each put into a static state after a predetermined time-out period of inactivity for that device. In a static state, each device consumes minimal power. In local standby state 162, devices that can be put into static states are CPU 112, video controller 113a (see further discussion below), pen controller 110a, UART 134, and transmitter/receiver subsystem 114. Backlighting of the LCD video display is also disabled in local standby state 162, if not input activities are detected in keyboard controller 125 or pen controller 110a, after the later of their respective preset time out period. Each of these devices emerges from the static state, if an activity relevant to its operation is detected, e.g. a pen event is detected.

The user of viewer 100 can place viewer 100 in the "sleep"mode by selecting an icon labelled "sleep"from the GUI. Alternatively, "sleep" mode is entered from active and local standby states 161 and 162 after a preset period of inactivity. In "sleep" mode, corresponding to either "sleep" state 163 or "active sleep" state 164, LCD subsystem 113 is switched off, and most devices are placed in static states. When a keyboard or pen event is detected, sleep state 163 and active sleep state 164 are exited, and viewer 100 enters active state 161. From sleep state 163, active sleep state 164 is entered when a communication packet is received from host computer 101. Although the LCD subsystem 113 is turned off, the received communication packet can result in an update to an image stored in video memory 113b. CPU 112 handles the communication packet from host computer 101 and activate video controller 113a to update such an image. Active sleep state 164 is invisible to the user of viewer 100, since the updated image is not displayed on LCD 113c. When the communication packet is handled, viewer 100 returns to sleep state 163. The device activities in viewer 100 under "sleep" mode are summarized in FIG. 1d.

Upon expiration of a timer, viewer 100 enters into "suspend" mode, which is indicated to a user of viewer 100 by a blinking LCD status display icon. In this implementation, the LCD status display is blinked once every second. In suspend mode, corresponding to internal state 165, viewer 100 is essentially turned off, except for the activity of the LCD status display icon. Under suspend mode, communication packets from host computer 101 are not handled. Viewer 100 emerges from suspend state 165 into active state 161, when a pen or a keyboard event is detected.

As mentioned above, video controller 113a supports various power management mode internal to the LCD subsystem 113. Power is conserved in LCD subsystem 113 by entering "standby" and "suspend" modes. In video controller 113a's "standby" mode, which can be entered by (i) expiration of a timer internal to video controller 113a, (ii) firmware in video controller 113a, or (iii) a signal received from system controller 129 on video controller 113a's "STANDBY" pin. Under video controller 113a's standby mode, LCD 113c is powered down and the video clock is suspended. Video controller 113a exits standby mode either under firmware control, or upon system controller 129's deasserting video controller 113a's STANDBY pin. Upon exiting standby mode, LCD 113c is powered and the video clock becomes active. In this implementation, the LCD 113c includes multiple power planes ("panels"). For reliability reasons, in a powering up or powering down operation, these panels in the LCD display are preferably powered in a predetermined sequence specified by the manufacturer.

Maximum power is conserved in LCD subsystem 113 when video controller 113a enters the "suspend" mode. The suspend mode can be entered either by asserting a signal from system controller 129 on the SUSPEND pin of video controller 113a, or under firmware control. In this implementation, if the suspend mode is entered from the SUSPEND pin, CPU 112 is prevented from accessing the video RAM 113*b* and input/output bus 113*d*. In that case, the contents of configuration registers in video controller 113*a* are saved, to be restored when suspend mode is exited. Under suspend mode, video RAM 113*b* are refreshed using the lowest possible refresh clock rate.

Figure 2:
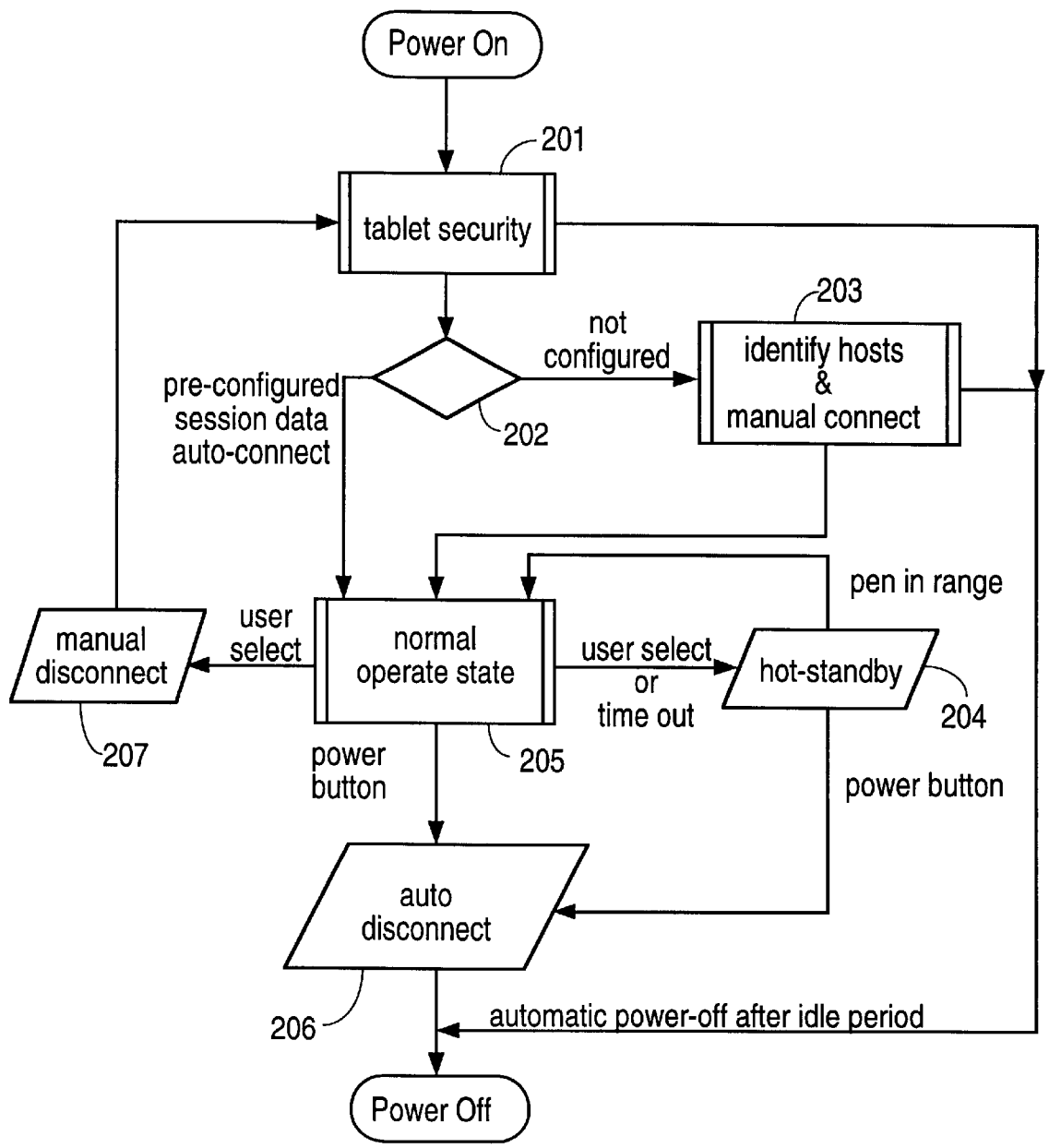
FIG. 2 is a block diagram illustrating the operational states of viewer 100 under a dedicated viewer software Viewer Manager 200.

FIG. 2 is a block diagram illustrating the operational states of viewer 100 under Viewer Manager 200. As shown in FIG. 2, upon power on, viewer 100 enters into state 201, in which an optional security step is performed. In state 201, the user performs a "log on" procedure which, as a security measure, identifies and validates the user. Then, at decision point 202, Viewer Manager 200 then determines if a procedure to set up a communication link is preconfigured. If so, a communication link is established automatically with host computer 101, and Viewer Manager 200 goes into the normal operation state 205, which is described in further detail below. If a communication link is not preconfigured, a manual procedure is performed in state 203, in which the desired host computer is identified and connected.

In state 205, viewer 100 is controlling the program running in host computer 101, in accordance with the input data received from stylus input subsystem 110. The positions of a stylus in stylus input subsystem 110 are delivered to host computer 101, which generates display commands to viewer 100. CPU 112 executes the display commands received. The execution of display commands may result in an update of LCD 113*c*. In this embodiment, either a direct user command or inactivity over a predetermined time period causes viewer 100 to enter a minimum power state ("sleep" mode), which is represented in FIG. 2 by state 204. In minimum power state 204, to preserve battery power, the various operation of viewer 100's functional units are placed on standby status. If the user brings stylus 110 within a predetermined range of viewer 100, viewer 100 is reactivated, and control of host computer 101 is resumed by re-entering state 205. Alternatively, in minimum power state 204, as well as normal operation state 205, the user may press the power button to signal termination of viewer use. Thereupon, viewer 100 enters into state 206, in which an auto-disconnect procedure is executed, which releases control of host computer 101, powers down viewer 100.

The user may also relinquish control of host computer 101 from state 205 by selecting a manual disconnect function. When the manual disconnect function is selected, viewer 100 enters manual disconnect state 207, in which the connection to host computer 101 is terminated. Viewer 100 is then returned to state 201 to accept the next user validation.

Figure 3A:
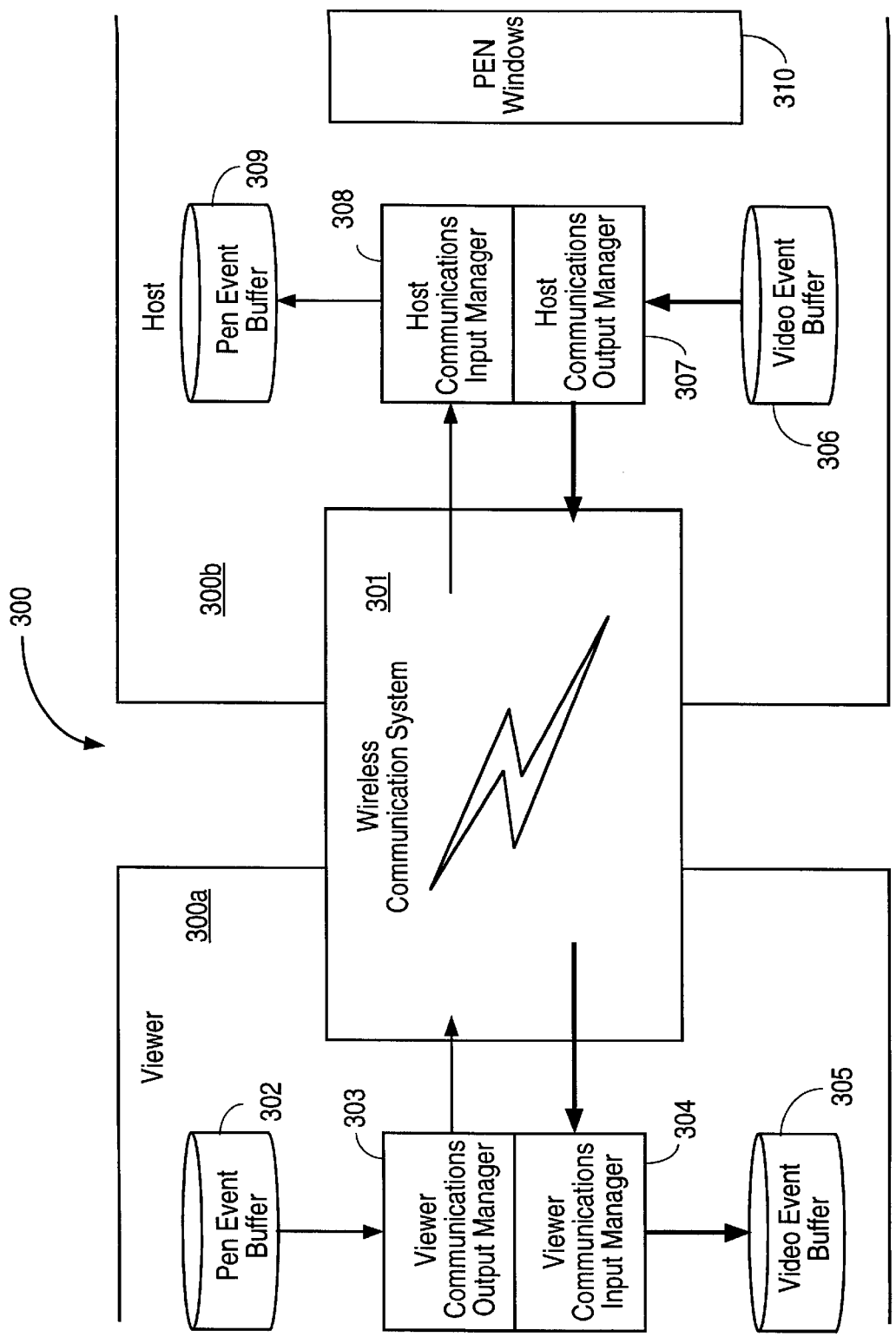
FIG. 3a is a block diagram of the software environment 300 under which viewer 100 and host computer 101 operate to provide viewer 100 remote control of host computer 101.

FIG. 3*a* is a block diagram of the software environment 300 under which viewer 100 and host computer 101 operate to provide viewer 100 remote control of host computer 101. As shown in FIG. 3*a*, a wireless communication system 301 is provided for communication between host computer 101 and viewer 100. On the side of viewer 100, i.e. software environment 300*a*, a viewer communication output manager 303 transmits pen events over wireless communication 301 to a host communication input manager 308 in host computer 101 (i.e. software environment 300*b*). The pen events include the position information of the stylus and tip-up and tip-down information. A pen event buffer 302 queues the pen events for transmission through viewer communications manager 303. In software environment 300*a*, viewer communications input manager 304 receives from wireless communication system 301 video events transmitted by host communication output manager 307 in software environment 300*b*. These video events include graphical commands for controlling LCD 113*c*. In software environment 300*a*, the received video commands are queue in video event buffer 305 to be processed by CPU 112 as graphical instructions to LCD 113*c*.

In Software environment 300*b*, i.e. in host computer 101, pen events are queued in pen event buffer 309, which is then provided to Pen Windows module 310. Pen windows module 301 processes the pen events and create video events in video event buffer 307, which is then transmitted to viewer 100 over wireless communication system 301.

Figure 3B:
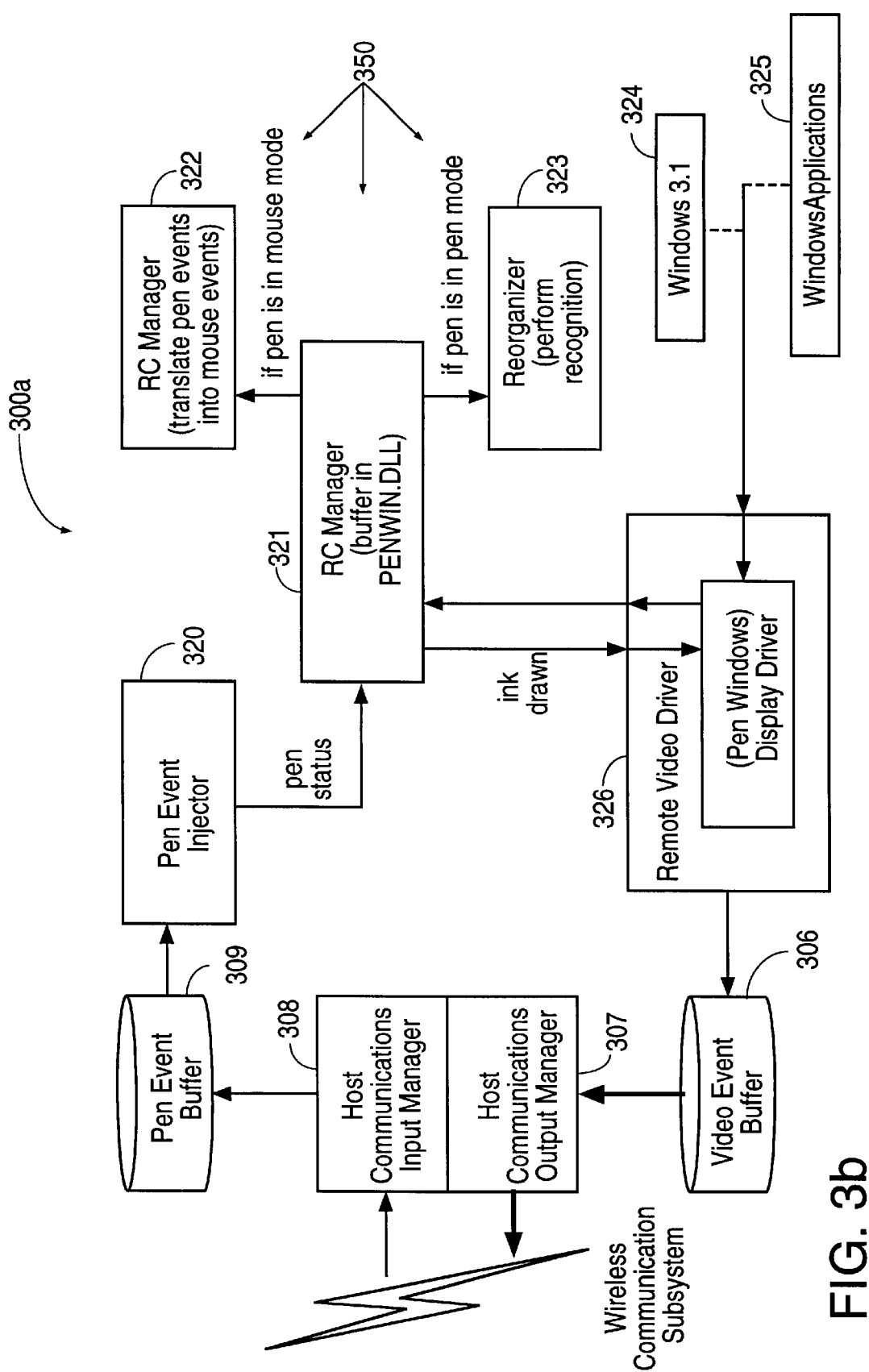
FIG. 3b is a block diagram which shows in further detail the software environment 300a in host computer 101, running an application program 325 under the Windows environment 324.

FIG. 3*b* is a block diagram which shows in further detail the software environment 300*b* in host computer 101, which is running an application program 325 under the Windows operating system 324. As shown in FIG. 3*b*, the pen events queued in pen event buffer 309 is provided to a pen event injector 320, which provides the pen events in pen event buffer 309 one pen event at a time to the a buffer ("RC buffer") 321 of the Recognition Context Manager module (the "RC manager") 350 in Pen Windows. RC buffer 321 holds a maximum of four pen events. The RC Manager assumes that pen events are received at RC buffer 321 as they occur. Thus, if the Pen Windows system is presented with pen events faster than they are retrieved from RC buffer 321, without pen event injector 320, the pen events that arrive at RC buffer 321 when it is full are lost. Pen event injector 320 prevents such data loss. To provide this capability, pen event injector 320 includes both Windows virtual device (VxD) and device driver (DRV) codes. The DRV portion removes a single pen event from pen event buffer 309 and delivers it to RC buffer 321 using the normal Pen Windows add and process pen event mechanisms. Then, VxD portion reactivates the DRV code after a minimum time delay using a virtual machine manager service to retrieve the next pen event from pen event buffer 309. Those of ordinary skill in the art would appreciate that, under the terminology used in Windows, DRV code refers to a dynamically linked library in Windows which interact with a hardware device (in this case, pen device buffer 309), and VxD code refers to a dynamically linked library which manages a sharable resource (in this case, the DRV code).

RC Manager 350 examines each pen event in RC buffer 321, and according to the context of the pen event in its possession, RC Manger 350 determines whether the stylus is in the pen mode or in the mouse mode. In this embodiment, an icon allows the user to use the stylus as a "mouse" device. The icon, called "mouse button toggle", allows the user to switch between a "left" button and a "right" button as used in an industry standard mouse device. The selected button is deemed depressed, when the stylus makes contact with the pressure sensitive digitizer panel. A rapid succession of two contacts with the display is read by RC Manager 350 as a "double click", and dragging the stylus along the surface of the display is read by RC Manager 350 as the familiar operation of dragging the mouse device with the selected button depressed.

If the stylus is in the pen mode, RC Manager 350 provides the pen event to a recognizer 323 to interpret the "gesture". Alternatively, if the pen event is a mouse event, RC Manager provides the pen event as a mouse event for further processing in module 322. The interpreted gestures or mouse events are further processed as input data to the Windows operating system (324) or the application program 325.

The output data from Windows (324) or application program 325 are provided to video event buffer 306. These video events are transmitted to host communication output manager 307 for transmission to viewer 100.

Figure 3C:
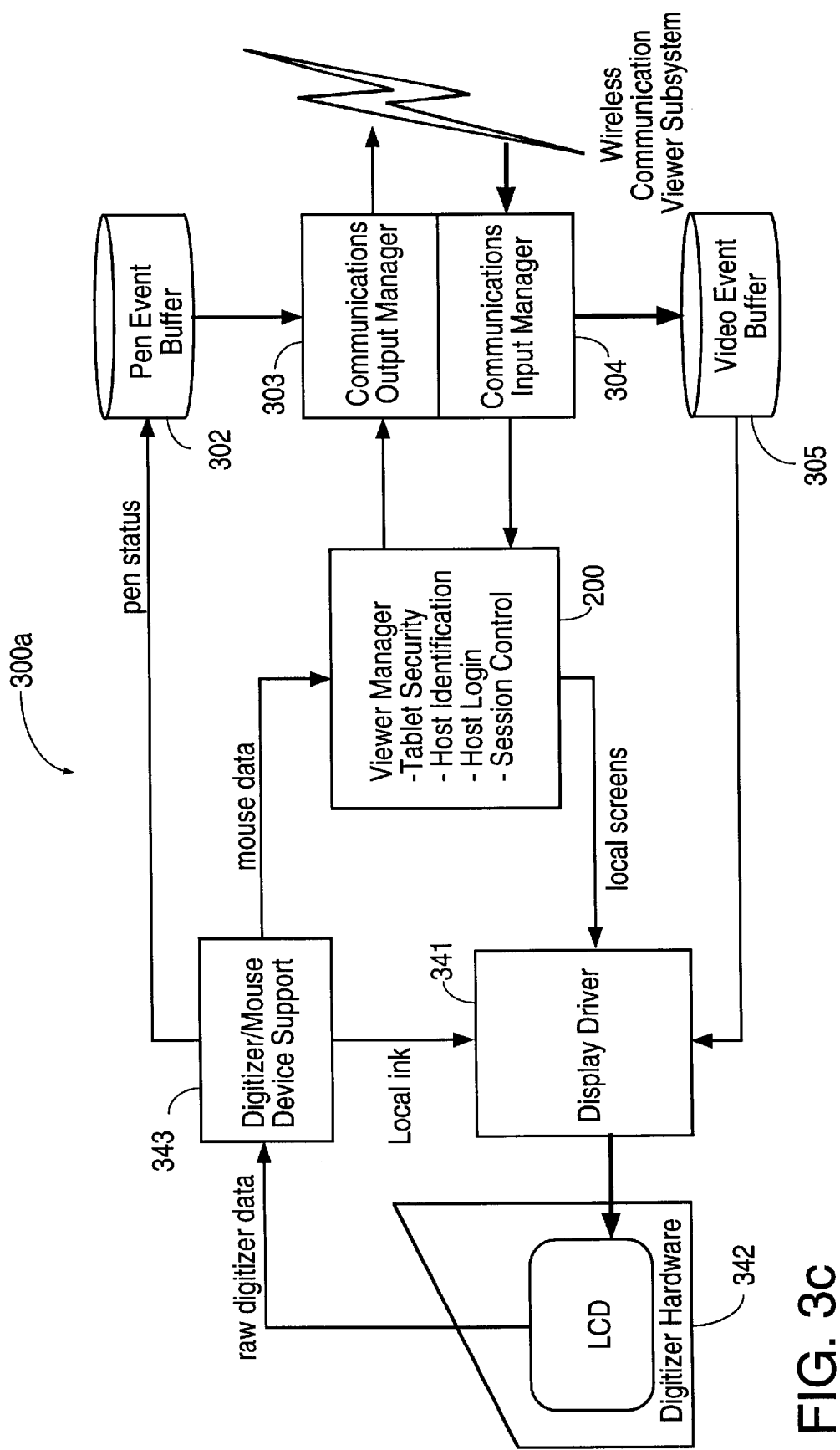
FIG. 3c is a block diagram which shows in further detail the software environment 300b in viewer 100, running under normal operation state 205.

FIG. 3*c* is a block diagram which shows in further detail the software environment 300*b* in viewer 100 under normal operation state 205 of Viewer Manager 200. In FIG. 3*c*, the stylus in stylus input subsystem 110 and LCD video display in video display subsystem 113 are shown collectively as digitizer-display device 342. Under normal operation state 205, Viewer Manager 200 interacts with the application program 325 in host computer 101 over Communications Output Manager 303 and Communications Input Manager 304. In addition, Viewer Manager 200 also receives digitized data from digitizer 343, which in turn receives digitized data from stylus input subsystem 110. Viewer Manger 200 uses the digitized data to provide visual feedback to the user, which is discussed in further detail below. Viewer Manager 200 generates local video commands to a display driver 341. Display driver 341 also receives from video event buffer 305 video display commands from host computer system 101.

At the core of viewer 100's user interface is the stylus's behavior under Pen Windows. Of significance in viewer 100's design is the emulation of the natural "pen-and-paper" interaction with the user. That is, under pen mode, the stylus must leave ink as it moves across the surface of the screen in the same way that a pen leaves ink on paper. However, under Pen Windows, RC Manager 350 residing in host computer 101 determines for each pen event whether the mouse or the pen mode is used.

If viewer 100's simplistically accesses host computer 101 as a local device access, the wireless link between host computer 101 and viewer 100 would be required to carry a minimum of two hundred inking messages per second (100 stylus tip locations plus 100 line drawing commands). To maintain the pen-and-paper emulation, viewer 100 is further required to have a total processing delay (hence response time), including the overhead of the communication protocols, which is near or below the human perception level. In addition, noise in the transmission medium often leads to momentarily interruption of data transmission, or results in data corruption that requires transmission, thereby further reduces the throughput of the wireless link. To provide an acceptable level of performance, i.e. a high message-per-second communication rate and an acceptable propagation delay, a technique referred to as "local inking" is developed and applied to viewer 100's design, in accordance with the present invention. Without local inking, a high bandwidth communication link is required to meet the propagation delay requirement. Such a high bandwidth communication link is impractical, both in terms of cost and its impact on the portability of the resulting viewer device.

Under local inking, Viewer Manager 200 provides inking on LCD 113c locally before the corresponding inking video events are received host computer 101. In this manner, visual feedback is provided virtually immediately without requiring either highly complex networking equipment, or very high performance and costly components in both viewer 100 and host computer 101. Local inking provides both a real time response and an orderly handling of the stylus's data stream. Since local inking reduces the need for processing at the peak pen event rate of stylus's data stream, host computer 101 can thus apply normal buffering techniques, thereby reducing the bandwidth requirement on the communication network.

As mentioned above, the stylus is used in both pen mode and mouse mode. Since RC Manager 350 on host computer 101, rather than a software module on viewer 100, determines whether a given pen event is a mouse mode event or a pen mode event, Viewer Manager 200 must anticipate which of these modes is applicable for that pen event. Further, should the anticipated mode prove to be incorrect, Viewer Manager 200 is required to correct the incorrectly inked image in video display subsystem 113.

Figure 4:
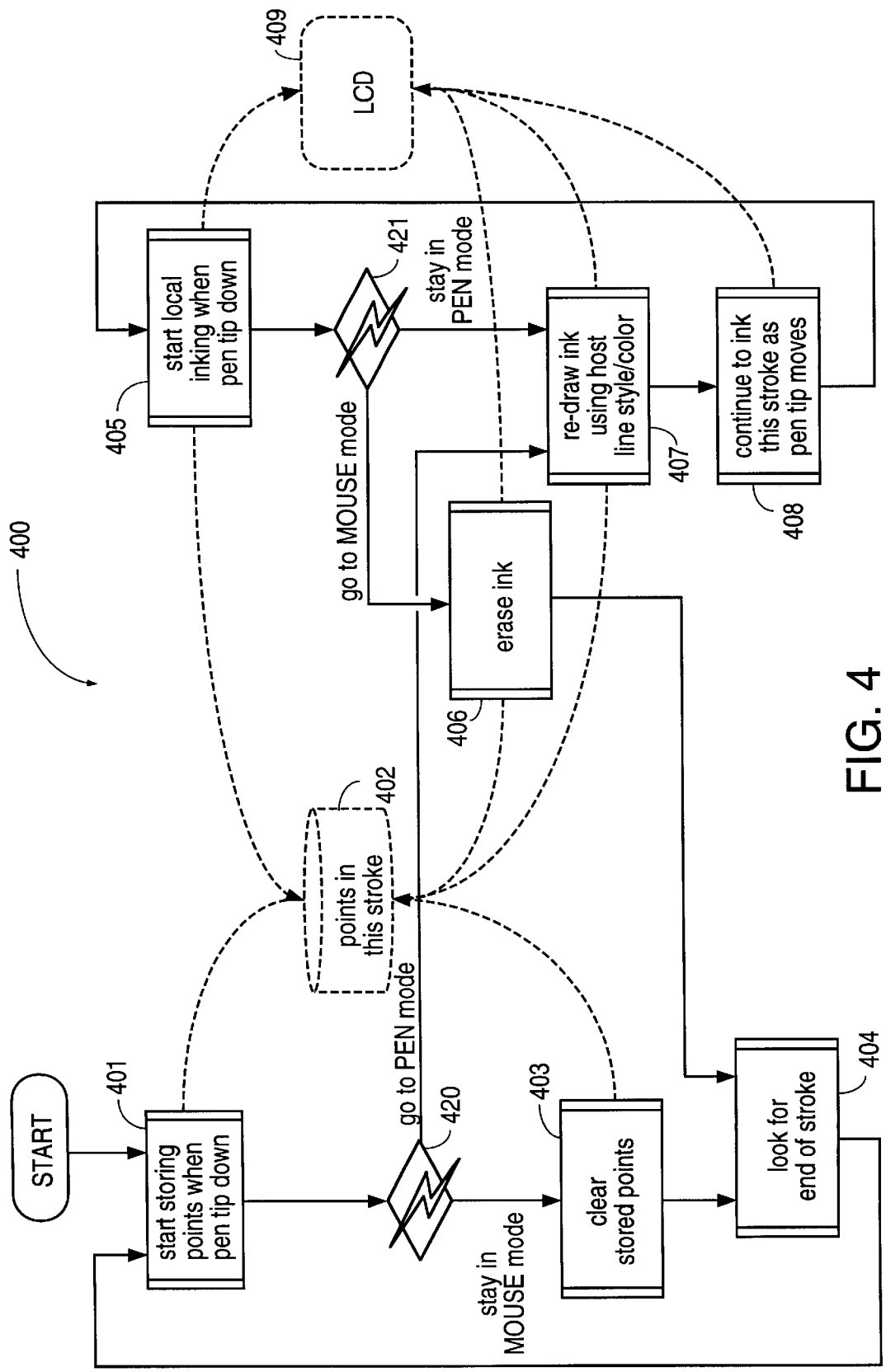
FIG. 4 illustrates the method used in viewer 100 to anticipate RC Manager 200's mode decision and to correct the image on display device 113 when a local inking error occurs.

FIG. 4 illustrates the method used in viewer 100 to anticipate RC Manager 200's mode decision and to correct the image in video display subsystem 113 when a local inking error occurs. As shown in FIG. 4, when operational state 205 is entered, a pen control program (represented by state diagram 400 of FIG. 4) in Viewer Manager 200 is initially in the mouse mode in state 401. However, even in the mouse mode, the trajectory of the stylus in contact with the pen digitizer is stored in a pen event buffer 402 until a mode message is received from host computer 101. Pen event buffer 402 is separate from pen event buffer 302, which is used to transmit the pen events to host computer 101. If RC Manager 350 confirms that stylus 110 is in mouse mode, the accumulated pen events are discarded and control program 400 waits for the last point on which the pen tip is in contact with the pen digitizer. Then, control program 400 returns to state 401, in which the trajectory of the pen is again accumulated in pen event buffer 402 until receipt of a mode message from host computer 101. In state 401, control program 400 assumes that the stylus will continue to be in the mouse mode.

Alternatively, while in state 401, if a mode message is received indicating the stylus is in the pen mode, control program 400 enters state 407, in which the accumulated pen events are drawn locally onto the LCD screen of video display subsystem 113 in accordance with the line style and color specified in the mode message. After all accumulated pen events in pen event buffer 402 are drawn, control program enters state 408 in which control program 400 continues to ink the trajectory of tip of the stylus for as long as contact with the pen digitizer is maintained. Once the tip of the stylus breaks contact with the pen digitizer, control program 400 enter state 405.

In state 405, control program 400 assumes that the stylus will continue to be in the pen mode. Thus, local ink will follow the trajectory of the stylus while the tip of the stylus remains in contact with the pen digitizer, or until a mode message is received from host computer 101, whichever arrives earlier. Since the initial policy decision is a guess, the local inking is drawn using a single pixel-wide style and an XOR ("exclusive OR") operation, in which the pixels at along the trajectory of the stylus are inverted. While in state 405, the pen events associated with the trajectory of the stylus is accumulated in pen event buffer 402.

If the mode message received in state 405 indicates that the stylus is in mouse mode, i.e. the policy decision was wrong, control program 400 then enters state 406, in which the accumulated pen events in pen event buffer 402 are used to erase the stylus stroke. Since the initial draw is accomplished by a bit XOR ("exclusive OR") operation at the appropriate positions of the frame buffer, erasure is simply provided by the same XOR operation at the same positions of the frame buffer. Control program 400 then enters state 404. However, if the mode message received in state 405 confirms that the stylus is in pen mode, the accumulated pen events of pen event buffer 402 is used to redraw on the LCD 113c, using the line style and color specified on the mode message.

Under a convention of Pen Windows, starting a stroke of the stylus with the barrel button depressed indicates an erase ink operation in pen mode. Control program 400 recognizes this convention and refrains from inking during this stroke without waiting for confirmation from host computer 101. In addition, control program 400 does not change modes across an erasing stroke: i.e. if the stylus is in the pen mode prior to the erase stroke, the stylus remains in the pen mode after the erase stroke; conversely, if the stylus is in the mouse mode prior to the erase stroke, the stylus remains in the mouse mode after the erase stroke.

Since all the pen events used in local inking on viewer 100 is also processed in host computer 101, the trajectory of local inking must coincide identically with the line drawn in host computer 101. Because of local inking, processing by host computer 101 within the human perceptual response time is rendered unnecessary. Thus, in host computer 101, the pen events can be queued at pen event buffer 309, to be retrieved one at a time by pen event injector 320. Hence, when pen event buffer 309 is suitably sized, data loss due to overflow by RC buffer 321 is prevented.

Alternatively, control program 400 can also be implemented to follow a "retractable ball-point pen" paradigm. Under this paradigm, the user controls a local stylus mode of the stylus, such that inking occurs when the stylus is set to be in the local pen mode, and no inking occurs when the stylus is in the local mouse mode. If the local stylus mode conforms with the mode expected by Pen Windows, the image seen on the LCD display of video display subsystem 113 is the same as described above with respect to state 405 of control program 400. If the local stylus mode is the mouse mode, and Pen Windows expects stylus 110 to be in the pen mode, the subsequent video events from host computer 101 would provide the required inking. Finally, if the local stylus mode is the pen mode, and Pen Windows expects the stylus to be in the mouse mode, inking would be left on the screen of video display subsystem 113. Under this paradigm, the user would eliminate the erroneous inking by issuing a redraw command to Pen Windows.

The above detailed description is provided to illustrate the specific embodiments of the present invention and is not intended to be limiting. Numerous variations and modifications are possible within the scope of the present invention. For example, the present invention's local response to the user can be extended into mouse mode as well. In that instance, a audio response, such as a click, can be provided through an audio subsystem to indicate receipt of a mouse mode input. Further, even though Pen Windows is used above to illustrate an operating system environment suitable for the MDPD described above, other pen based operating systems are also suitable for use with the present invention. The present invention is defined by the following claims.

What is claimed is:

1. A mobile user interface device for controlling a host computer, comprising:
   a graphical display subsystem, including a graphical display, for displaying an image;
   an input subsystem, including a stylus, for receiving from a user positional data representing spatial positions of said stylus; and
   a wireless communication subsystem for sending data to and receiving data from said host computer over a wireless communication link; and
   means for controlling operations of said graphical display subsystem, said input subsystem and said wireless communication subsystem, said means for controlling (i) causing said wireless communication link to be created; (ii) causing an application program to be run on said host computer; (iii) receiving from said input subsystem said positional data, providing a response to said user in acknowledgment of said positional data, and transmitting over said wireless communication link said positional data to said application program; and (iv) receiving over said wireless communication link from said application program data representing said image, and causing said graphical display subsystem to display said image on said graphical display: wherein said means for controlling comprises;
   a central processing unit;
   a processor bus coupled to data and address terminals of said central processing unit;
   a memory subsystem accessible by said central processing unit over said processor bus;
   a peripheral bus coupled to said input device subsystem, said graphical display subsystem and said wireless communication subsystem;
   a system controller unit, coupled to said processor and peripheral busses and under the control of said central processing unit, for controlling over said peripheral bus the operations of said input device subsystem, said graphical subsystem, and said wireless communication subsystem.

2. A mobile user interface unit as in claim 1, further comprising a keyboard controller coupled to said peripheral bus for receiving keyboard input from one of: (i) a keyboard connected to said mobile user interface; and (ii) a keyboard emulation program executed by said central processing unit, wherein said keyboard emulation program mapping said positional data received in said input subsystem to selections of keys from a keyboard image displayed on said graphical display.

3. A mobile user interface device as in claim 1, wherein said system controller unit includes a power conservation circuit for temporarily suspending operation of said mobile user interface device when a predetermined time period elapses without positional data received in said input subsystem.

4. A mobile user interface device for controlling a host computer, comprising:
   a graphical display subsystem, including a graphical display, for displaying an image;
   an input subsystem, including a stylus, for receiving from a user positional data representing spatial positions of said stylus; and
   a wireless communication subsystem for sending data to and receiving data from said host computer over a wireless communication link; and
   means for controlling operations of said graphical display subsystem, said input subsystem and said wireless communication subsystem, said means for controlling (i) causing said wireless communication link to be created; (ii) causing an application program to be run on said host computer; (iii) receiving from said input subsystem said positional data, providing a response to said user in acknowledgment of said positional data, and transmitting over said wireless communication link said positional data to said application program; and (iv) receiving over said wireless communication link from said application program data representing said image, and causing said graphical display subsystem to display said image on said graphical display;
   wherein said host computer interprets said positional data as representing digitized strokes of a handwriting.

5. A computer system comprising:
   a hand-held interface device comprising (i) a display device; (ii) a position input device, said position input device receiving positional data representative of a current location of said position input device; (iii) a wireless receiver and transmitter circuit, said wireless receiver and transmitter circuit transmitting said positional data; and (iv) control means for providing an image on said display device; and a host computer being coupled to (i) a wireless receiver and transmitter circuit for communicating with said hand held interface device, said wireless receiver and transmitter circuit of said host computer receiving said positional data; and (ii) means for modifying said image in accordance with said positional data;

wherein said wireless receiver and transmitter circuit is accessed by said host computer as a shared resource on a local area network, and said position input device provides a plurality of data points each indicating a position of said position input device relative to an origin, said data points being queued in a pen event buffer in said hand held interface device for transmission to said host computer over a wireless link established between said wireless receiver and transmitter circuit of said hand held interface device and said wireless receiver and transmitter circuit coupled to said host computer.

6. A computer system as in claim 5, wherein said host computer provides commands over said wireless link for displaying graphical images on said display device of said hand held interface device.

7. A computer system as in claim 5, wherein said host computer has (i) buffer means for storing said data points received over said wireless link; (ii) means for processing said data points; and (iii) an event injector means for introducing said data points one by one into said means for processing.

8. A method for providing a mobile user interface device, comprising:

providing a graphical display;

providing an input device for indicating locations on said graphical display;

providing a wireless transceiver for communicating display information from said host computer to said mobile user interface device and for communicating said locations from said mobile user interface device to said host computer;

sending data representing said locations to said host computer over said wireless link; and interpreting in said host computer said locations as representing digitized strokes of a handwriting.

9. A method as in claim 8, further comprising the step of providing a power conservation circuit for temporarily suspending operation of said mobile user interface device when a predetermined time period elapses during which said positional and selection data are out of a predetermined range.

* * * * *